Patented Aug. 15, 1933

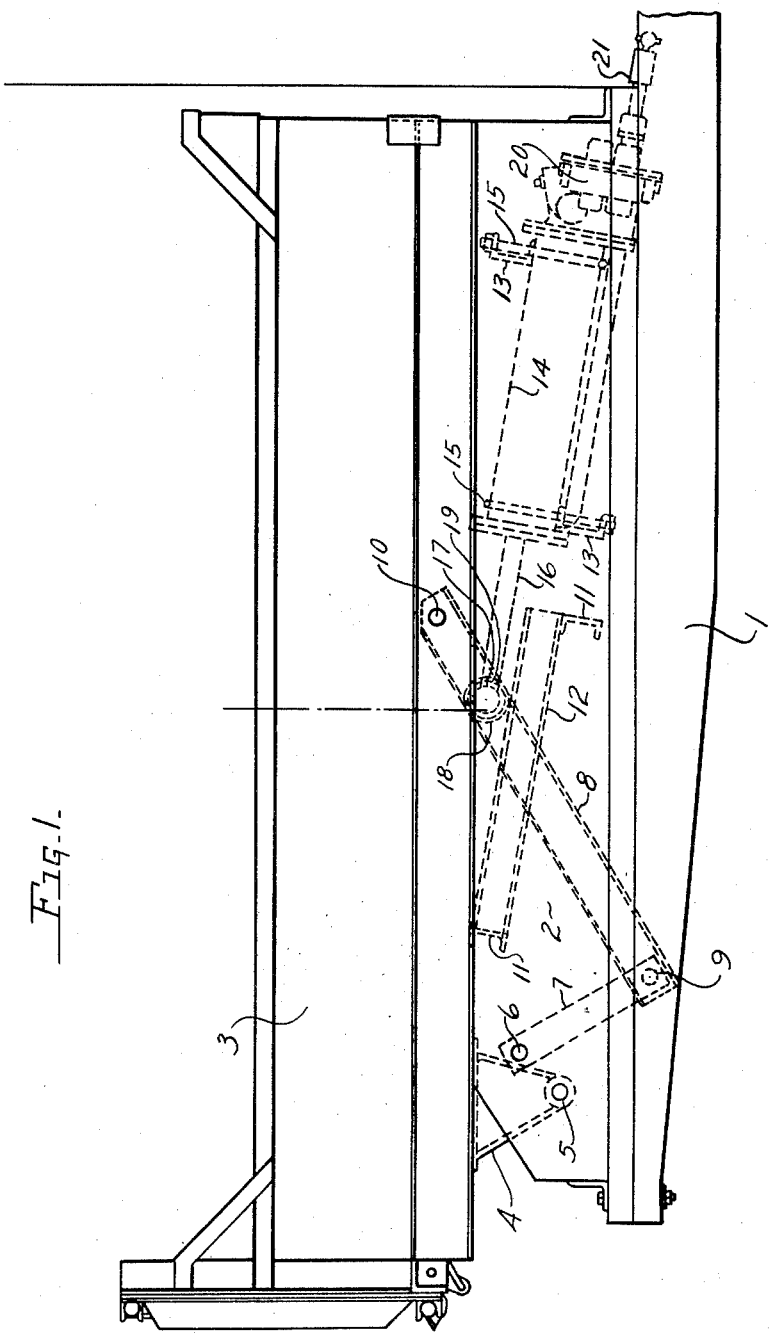

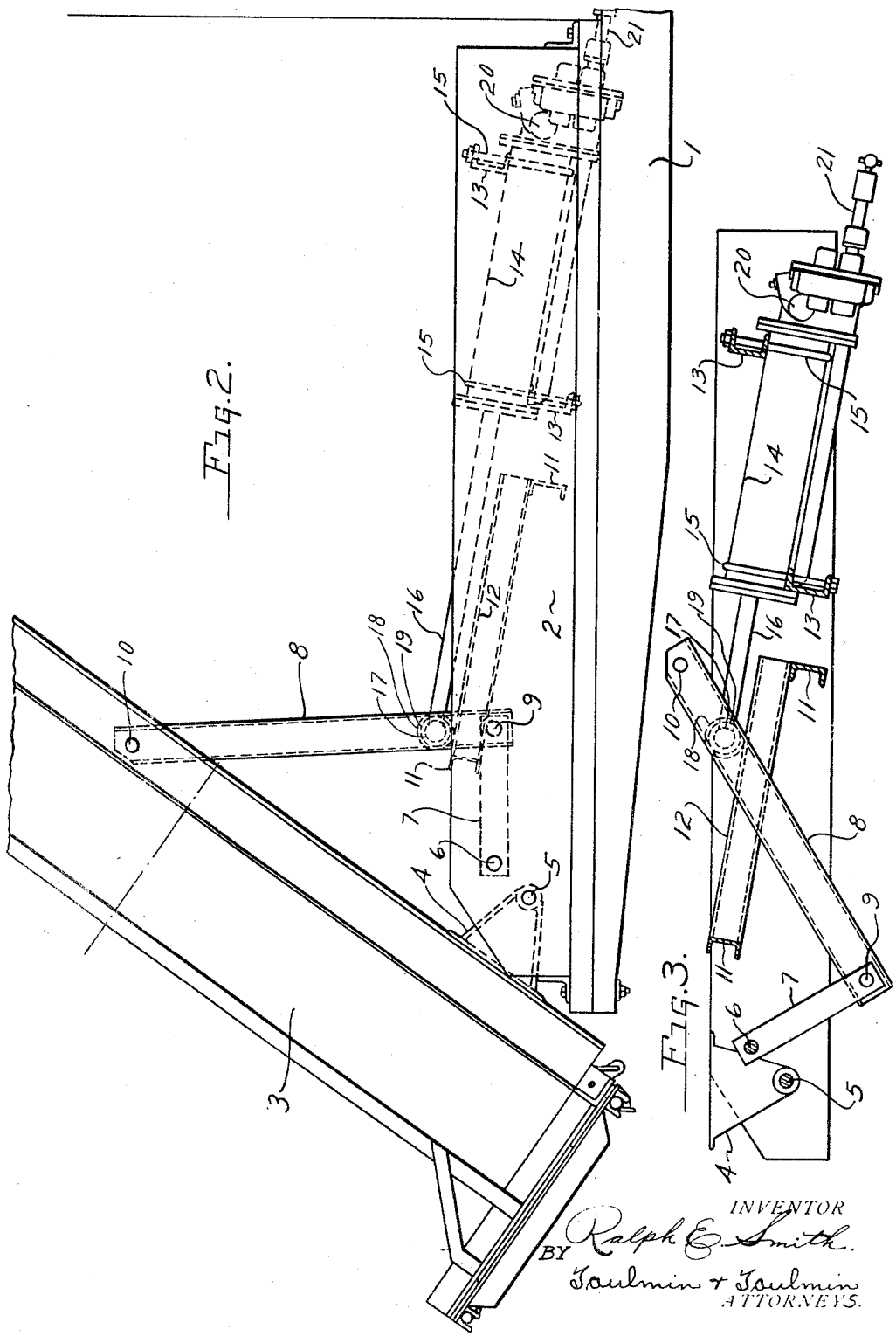

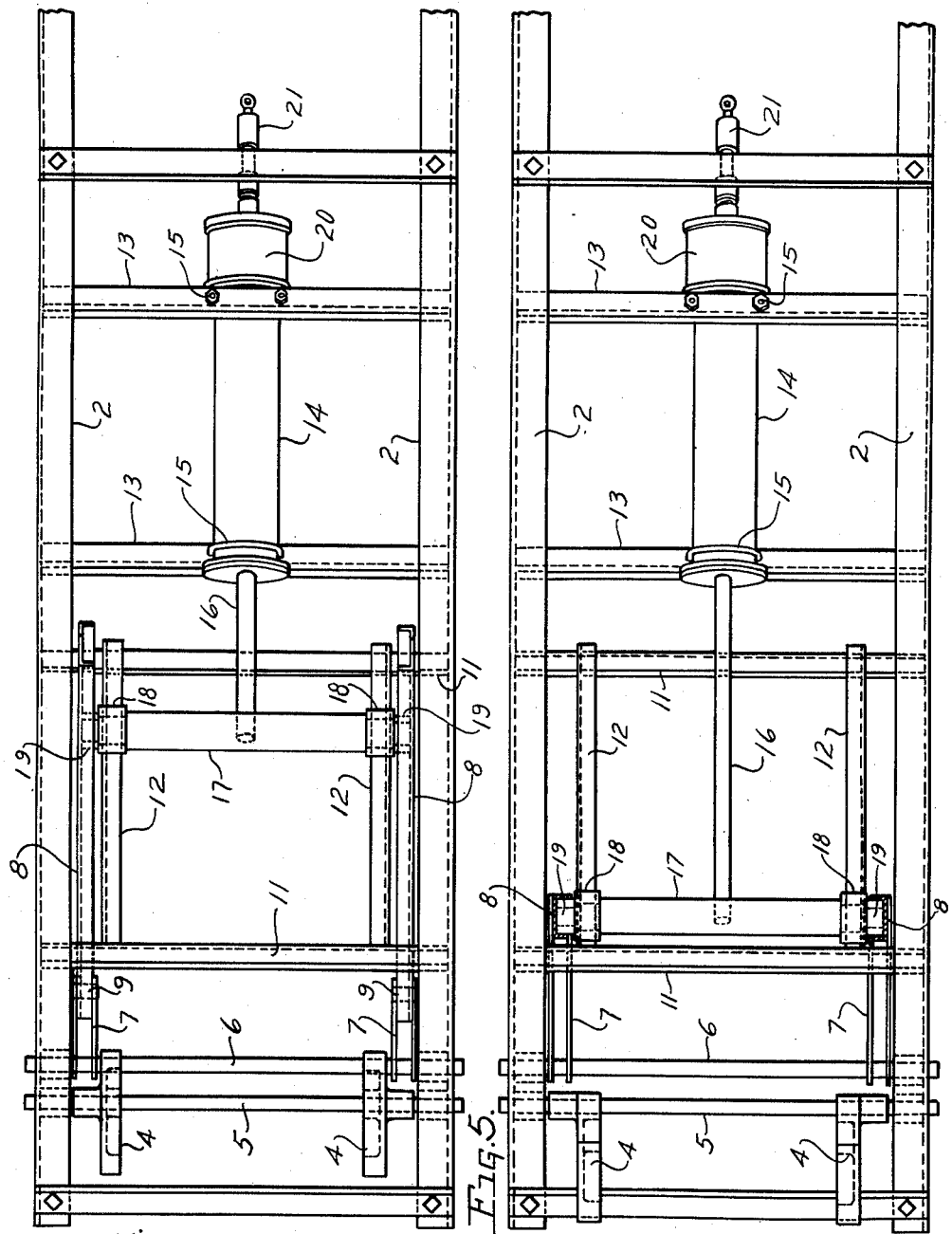

1,922,111

UNITED STATES PATENT OFFICE 1,922,111

DUMP BODY CONSTRUCTION

Ralph E. Smith, Galion, Ohio, assignor to The Galion Metallic Vault Co., Galion, Ohio, a Corporation of Ohio Application June 12, 1931. Serial No. 543,759

16 Claims. (Cl. 298—22)

This invention relates to improvements in dump bodies, and has for its object to provide a wedge and lever means for dumping the body of a truck, with the power applied in such a manner that it is always applied to the truck body in front of the center of gravity so there is the greatest amount of lifting force available at all stages of the dumping action.

It is particularly the object of this invention to provide, in connection with a body pivoted at its rear end, link mechanism operated on by a traveling head member to dump the body, said traveling head engaging the links at a certain point so that the point of contact between the head and the links is always in front of the center of gravity of the body.

It is also an object of this invention to provide, in connection with means for dumping the body of a truck, means by which the power applied can be utilized to the greatest extent in the beginning of the dumping action and as the body is approaching the end of its dumping action where less force is required, less force is available.

These and other advantages will appear from the following description taken in connection with the drawings, in which there is shown a preferred embodiment of the invention.

Referring to the drawings:

Figure 1 is a side view of the truck body and part of the truck frame, showing in dotted lines the means for dumping the body.

Figure 2 is a view similar to Figure 1, with the body in dumping position. The operating mechanisms are shown in dotted lines in the position they will assume when the body is being dumped.

Figure 3 is a longitudinal section through the subframe showing the operating and hoisting mechanism for dumping the body.

Figure 4 is a top plan view of the body operating mechanism in a position for sustaining the body in a horizontal position.

Figure 5 is a view similar to Figure 4 but with the operating parts in the position in which the body is dumping.

The numeral 1 is used to designate the frame, such as is usually found on trucks and such vehicles. This truck frame has attached thereto in any suitable manner a sub-frame 2, which is used for supporting directly the body 3. To the rear of the body, on each side thereof at the bottom, is a bracket 4 which is pivotally mounted upon a cross rod 5, suitably supported in the sub-frame 2. There are in the present instance two of these brackets, one on each side adjacent each member of the sub-frame 2 for supporting the rear end of the body so that it may tilt.

When the body is in horizontal position, as shown in Figure 1, it rests on the upper surface of the sub-frame. In addition to the rod 5 there is adjacent and slightly above, and to the front of it, a cross rod 6 which has connected thereto adjacent each side of the sub-frame, one end of a pair of arms 7. To the other end of each pair of arms is attached one end of a channel iron link 8, as indicated by the numeral 9, which indicates the point where these two members 7 and 8 are attached to each other.

The end of the link or lever 8 remote from the pivot 9 is attached to the body pivotally, as indicated by the numeral 10. These links or levers 8 and arms 7 are used for elevating the body for dumping purposes. There are attached to the upper or sub-frame 2, two channel irons 11. These irons are attached to the sides of the frame in any suitable manner, the rear one having attached to it one end of each of two rail or trackway members 12, while the front ends of these two members rest upon the forward transverse channel iron 11. The forward channel iron is located near the lower edges of the sides of the sub-frame so that these trackways are inclined from the front of the truck toward the rear, as illustrated in Figure 3.

Near the front ends of the sub-frame are two other transverse channel irons 13, one located adjacent the lower edges of the sides of the frame, while the other one is located adjacent the upper edges of the sides of the frame. To these channel irons is attached a cylinder 14 by means of U-bolts 15, one at each end for each channel iron 13. By means of these bolts the cylinder is attached to the channel irons 13, one end being below one channel iron and the other end being above and resting upon the other channel iron.

In this cylinder there is a piston, not shown, from which a piston rod 16 extends through one end of the cylinder. On the outer end of the piston rod is a cross head 17 substantially as long as the width of the sub-frame. Adjacent each end of the cross head is a roller 18 adapted to rest upon and roll up on one of the trackways 12. On the ends of this cross head are rollers 19.

All of these rollers are loosely mounted on and adjacent the ends of the cross head 17 so that as the piston rod moves in and out of the cylinder the cross head may travel with the rollers 18 on the trackways 12 and the rollers 19 engaging in the trackways provided by the channel iron links 8. This cylinder is filled with oil and is operated by oil pressure provided by a pump mechanism 20. This pump is operated by a shaft 21 suitably attached to the motive power of the truck.

In Figure 1 the body is shown in its normal load-carrying position. When it is desired to dump the body a lever located in the cab is operated to admit oil into the lower end of the cylinder. This oil being under pressure from the pump forces the piston within the cylinder from the front end toward the rear end. This movement of the piston causes the piston rod 16 to move outwardly, carrying with it the cross head 17. As the cross head 17 moves the rollers 18 travel along the upper surfaces of the trackways 12. As the cross head travels along the trackways 12 the roller 19 engages the channel iron links 8 and by a wedging action between the trackways and the links force the body upwardly from a horizontal position, as shown in Figure 1, to a position shown in Figure 2 for dumping purposes.

It will be observed from an examination of these two figures that the power applied to the body for dumping purposes is always to the front of the center of gravity of the body. It will be observed also that when the body is in a horizontal position and the greatest force is needed for raising the body, a wedging action is effected thereby increasing the power applied to the body without increasing the actual original power from its source. This is effected by means of the wedging action between the links 8 and the trackways 12. As the cross head advances along the trackways the wedging action diminishes gradually as the body leaves the horizontal position more and more. After the links 8 assume a position at right angles to the trackways there is no wedging action. The whole dumping effect is obtained by the action of the cross head upon the links 8, but at this time the body is substantially dumped and little power is needed to finish the dumping action.

After the material has been fully dumped from the body pressure is removed from behind the piston so that the cross head travels back down the trackways to the position shown in Figure 1, and at the same time the body travels from the dumping position to a substantially vertical position, as shown in Figure 1.

I desire to comprehend within my invention such modifications as may be embraced within my claims and the scope of my invention.

Having thus fully described my invention, what I claim as new and desire to secure by Letters Patent, is:

1. In a dump truck, in combination with a frame and a body pivotally attached to the frame, a channel-shaped link at each side of the body pivotally connected at one end to the body a second link pivoted at its upper end to the frame and at its other end to the other end of the channel link, a guide on the frame, and means movable along the guide for operating the links to cause the body to dump, said means having a roller engaging the guide and a roller engaging in the channel of each channel-shaped link, whereby as the means moves along the guide the links will move along the second rollers.

2. In a dump truck, in combination with a frame and a body pivotally attached to the frame, a channel-shaped link at each side of the body pivoted at one end to the body, a second link pivotally connected at its upper end to the frame and at its lower end to the other end of the channel link, a pair of guides, one adjacent each channel link, and means engaging the guides and the channel links to cause the body to dump, said means including a pair of rollers to move along the guides and a pair of rollers engaging in the channels of the channel links.

3. In a dump truck, in combination with a frame and a body pivotally attached to the frame, a channel iron link at each side of the body pivotally attached at one end to the body, a second link pivotally connected at it lower end to the other end of the channel link and at its other end to the frame, a trackway on the frame, means on the trackway to act on the channel links to dump the body, said means including a cross head having thereon rollers engaging the trackway and rollers engaging in the channel iron links, and means to move the cross head along the trackway.

4. In a dump truck, in combination with a frame and a body pivotally attached to the frame, a link at each side of the body pivotally attached at one end to the body, a second link pivotally connected at its lower end to the other end of the channel link and at the other end to the frame, an inclined trackway on the frame, means on the trackway moving parallel therewith to act on the channel links to dump the body, said means including a cross head having thereon rollers engaging the trackway and rollers engaging the channel links, and means to move the cross head along the trackway and along the links, whereby the links swing upwardly and move bodily upward.

5. In a dump truck, in combination with a frame and a body pivoted at one end to the frame, a rearwardly inclined track, a link pivoted at one end to each side of the body, a second link pivotally connected at its lower end to the first-named link and at its other end to the frame, and pushing means adapted to move along the track and engage the first-named links, said pushing means including a cross head having rollers on the track and other rollers engaging the first-named links, whereby a wedging action is applied between the levers and the track at the beginning of the dumping movement.

6. In a dump truck, in combination with a frame and a body pivoted at one end to the frame, a rearwardly inclined track, a link pivoted at one end to each side of the body, a second link pivotally connected at its lower end to the first-named link and at its other end to the frame, and pushing means adapted to move along the track and engage the first-named links, said pushing means including a cross head having rollers on the track and other rollers engaging the first-named links, whereby a wedging action is applied between the levers and the track at the beginning of the dumping movement and power is applied progressively from the body ends of the links toward the frame ends thereof.

7. In a dump truck, in combination with a frame and a body pivoted at one end to the frame, a rearwardly inclined track on the frame, a pair of levers, each connected at one end to the body and connected at the other end by means of a link to the frame, each link being pivoted at one end to the frame and extending forwardly and downwardly, a cylinder on the frame, and a piston in the cylinder having thereon a cross head moving on the track and engaging the levers, whereby a wedging action is had on the levers in the early stages of dumping and lever action in all stages of dumping in which the point of application of power through the moving cross head gradually moves from the weight end of the levers to the pivot end of the levers.

8. In a dump truck, in combination with a frame and a body pivoted to the frame, a rearwardly inclined trackway on the frame, a pair of straight levers, one on each side of the trackway, one end of each lever being pivotally connected to the body while the other end is pivotally connected by means of a link to the frame, each link being pivoted at one end to the frame and extending forwardly and downwardly, said levers being forwardly inclined at an acute angle to the trackway when the body is in load-carrying position, and means movable along the trackway between the trackway and the levers to lift the body, whereby at the beginning of the movement great power is applied to the body with slow rate of movement and as the movement continues the power applied to the body decreases and the rate of movement of the body increases, the power in and the rate of movement of the movable means remaining the same.

9. In a dump truck, in combination with a frame and a body pivoted to the frame, a rearwardly inclined trackway on the frame, a pair of straight levers, one on each side of the trackway, one end of each lever being pivotally connected to the body while the other end is pivotally connected by means of a link to the frame, each link being pivoted at one end to the frame and extending forwardly and downwardly, said levers being forwardly inclined at an acute angle to the trackway when the body is in load-carrying position, and roller-supported means movable along the trackway between the trackway and the levers to lift the body, whereby at the beginning of the movement great force is applied to the body with slow rate of movement and as the movement continues the force applied to the body decreases and the rate of movement of the body increases, the power in and the rate of movement of the movable means remaining the same.

10. In a dump truck, in combination with a frame and a body pivoted to the frame, a rearwardly inclined trackway on the frame, a pair of straight levers, one on each side of the trackway, one end of each lever being pivotally connected to the body while the other end is pivotally connected by means of a link to the frame, each link being pivoted at one end to the frame and extending forwardly and downwardly, said levers being forwardly inclined at an acute angle to the trackway when the body is in load-carrying position, means movable along the trackway between the trackway and the levers to lift the body, whereby at the beginning of the movement great force is applied to the body with slow rate of movement and as the movement continues the force applied to the body decreases and the rate of movement of the body increases, the power in and the rate of movement of the movable means remaining the same, and means for applying a constant pressure to the movable means.

11. In a dump truck, in combination with a frame and a body pivoted to the frame, a rearwardly inclined trackway on the frame, a pair of straight levers, one on each side of the trackway, one end of each lever being pivotally connected to the body while the other end is pivotally connected by means of a link to the frame, each link being pivoted at one end to the frame and extending forwardly and downwardly, said levers being forwardly inclined at an acute angle to the trackway when the body is in load-carrying position, means movable along the trackway between the trackway and the levers to lift the body, whereby at the beginning of the movement great force is applied to the body with slow rate of movement and as the movement continues the force applied to the body decreases and the rate of movement of the body increases, the power in and the rate of movement of the movable means remaining the same, and means operated by the motive power of the truck for applying a constant pressure to the movable means.

12. In a dump truck, in combination with a frame and a body pivoted to the frame, a rearwardly inclined trackway on the frame, a pair of straight levers, one on each side of the trackway, one end of each lever being pivotally connected to the body while the other end is pivotally connected by means of a link to the frame, each link being pivoted at one end to the frame and extending forwardly and downwardly, said levers being forwardly inclined at an acute angle to the trackway when the body is in load-carrying position, means movable along the trackway between the trackway and the levers to lift the body, whereby at the beginning of the movement great force is applied to the body with slow rate of movement and as the movement continues the force applied to the body decreases and the rate of movement of the body increases, the power in and the rate of movement of the movable means remaining the same, and fluid pressure means operated by the motive power of the truck for applying pressure to the movable means.

13. In a dump vehicle, a body frame, a body pivoted thereon, a link pivoted to the body, a second downwardly and forwardly declined link pivoted to the frame and at its lower end to the free end of the first link, and means for engaging the first-mentioned link and to move along said link to elevate the body about its pivotal support on the frame.

14. In combination, a frame, a body pivoted at its rear end to the rear end of said frame, a link pivotally connected to the body in advance of the center of gravity thereof, a second link supporting the free end of the first-mentioned link and pivoted to the frame to the rear of the center of gravity of the body, said second link extending downwardly and forwardly from its pivot on the frame, and means for engaging and bodily elevating the first-mentioned link and the body by first engaging the link in advance of the center of gravity of the body and continuing the engagement therewith to a point beyond the center of gravity of the body.

15. In combination, a frame, a body pivoted at its rear end to the rear end of said frame, a link pivotally connected to the body in advance of the center of gravity thereof, a second link supporting the free end of the first-mentioned link and pivoted to the frame to the rear of the center of gravity of the body, said second link extending downwardly and forwardly from its pivot on the frame, and means for engaging and bodily elevating the first-mentioned link and the body by first engaging the link in advance of the center of gravity of the body and continuing the engagement therewith to a point beyond the center of gravity of the body, said parts being so arranged that the first-mentioned link will move from a forwardly inclined position to a vertical position and the second link will move from a forwardly and downwardly extending position to a horizontal position.

16. In combination, a supporting frame, a body pivoted thereon, elevating means comprising a hydraulic cylinder, piston and piston rod, wedging means between said body and said piston rod, and compound lever means comprising a lever and a link working at right angles to each other associated therewith whereby a greater dumping force is exercised with less motion in the initial stages of dumping and as the dumping action continues the dumping force diminishes but the dumping movement of the body rapidly increases, the link moving during dumping from a forwardly and downwardly extending position to a forwardly extending horizontal position.

RALPH E. SMITH.